United States Patent
Zhang et al.

(10) Patent No.: US 11,069,112 B2
(45) Date of Patent: Jul. 20, 2021

(54) SYSTEMS, METHODS, AND DEVICES FOR CREATING A SPLINE-BASED VIDEO ANIMATION SEQUENCE

(71) Applicant: Sony Interactive Entertainment LLC, San Mateo, CA (US)

(72) Inventors: Xun Zhang, San Mateo, CA (US); David Scott Lee Swenson, Novato, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/816,890

(22) Filed: Nov. 17, 2017

(65) Prior Publication Data
US 2019/0156546 A1    May 23, 2019

(51) Int. Cl.
G06T 13/40 (2011.01)
G06T 15/04 (2011.01)
A63F 13/52 (2014.01)

(52) U.S. Cl.
CPC .............. *G06T 13/40* (2013.01); *A63F 13/52* (2014.09); *G06T 15/04* (2013.01)

(58) Field of Classification Search
CPC .......... G06K 9/00335; G06K 9/00228; G06K 9/00248; G06K 9/00281; G06K 9/00302; G06K 9/00308; G06K 9/00315
See application file for complete search history.

(56) References Cited

U.S. PATENT DOCUMENTS

| | | | | |
|---|---|---|---|---|
| 9,064,350 | B2* | 6/2015 | Seah | G06T 13/80 |
| 2009/0232353 | A1* | 9/2009 | Sundaresan | G06K 9/00342 |
| | | | | 382/103 |
| 2010/0030578 | A1* | 2/2010 | Siddique | G06Q 40/12 |
| | | | | 705/3 |
| 2011/0317874 | A1* | 12/2011 | Ikenoue | G06F 3/017 |
| | | | | 382/103 |
| 2013/0071031 | A1* | 3/2013 | Huang | G11B 27/034 |
| | | | | 382/190 |
| 2016/0284123 | A1* | 9/2016 | Hare | G06T 7/55 |
| 2017/0266491 | A1* | 9/2017 | Rissanen | G06K 9/00342 |

(Continued)

FOREIGN PATENT DOCUMENTS

WO    WO 2019/099201    5/2019

OTHER PUBLICATIONS

Cubic Hermite spline, Wikipedia, Jul. 20, 2016 (Year: 2016).*

(Continued)

*Primary Examiner* — Ming Wu
(74) *Attorney, Agent, or Firm* — Polsinelli LLP

(57) ABSTRACT

A spline-based animation process creates an animation sequence. The process receives a plurality of frames that illustrate a figure based on a design template (e.g., which includes a skeleton having segments). The process further identifies a spine segment, generates hip, shoulder, and head segments at respective positions relative to the spine segment, identifies limb and facial feature segments, and converts the segments into respective splines bound between endpoints. The process further determines changes between frames for respective splines and animates movement of the figure over a sequence of frames based on the changes.

27 Claims, 11 Drawing Sheets

(56) References Cited

U.S. PATENT DOCUMENTS

2018/0024726 A1\* 1/2018 Hviding .............. G06F 3/04845
715/204

OTHER PUBLICATIONS

Gift Wrapping Algorithm, Wikipedia, Jun. 24, 2016 (Year: 2016).\*
Game Character Creation Series: Kila Chapter 7—Facial Rigging with Joints; Jan. 29, 2014; Antony Ward (Year: 2014).\*
PCT/US18/58526, Systems, Method, and Devices for Creating a Video Animation Sequence, Oct. 31, 2018.
PCT Application No. PCT/US218/058526 International Search Report and Written Opinion dated Dec. 26, 2018.

\* cited by examiner

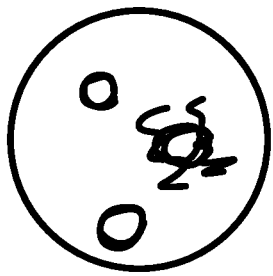
705a
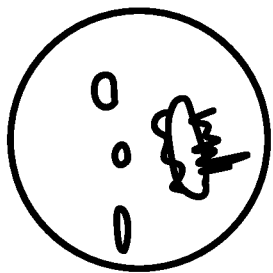
710a
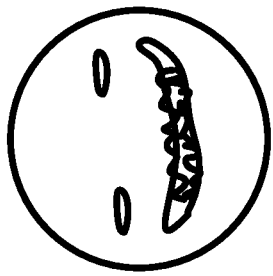
715a
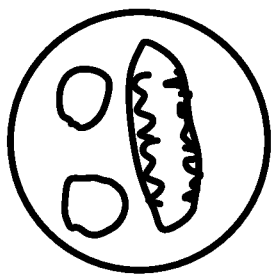
720a
700
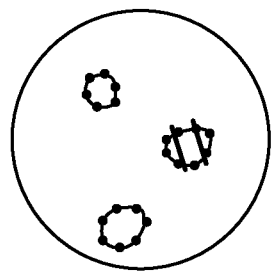
705b
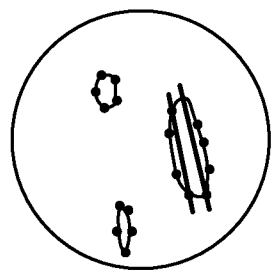
710b
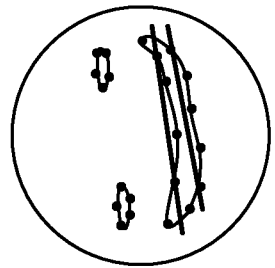
715b
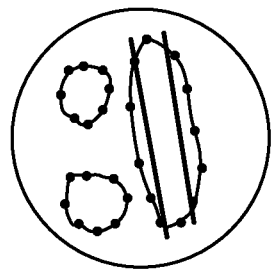
720b
*FIG. 7*

SYSTEMS, METHODS, AND DEVICES FOR CREATING A SPLINE-BASED VIDEO ANIMATION SEQUENCE

TECHNICAL FIELD

The present disclosure generally relates to computer animation, and more particularly to creating an animation sequence.

BACKGROUND

Computer animation typically involves building an animated figure or object with a virtual skeleton, illustrating movement of the virtual skeleton over a sequence of frames, and mapping texture or surface data (e.g., "skinning") during a rendering process. Virtual skeletons are often described by a wire frame model, which can include polygons joined together by joints. In turn, these joints describe movement (e.g., changes in position, orientation, shape or behavior) of the model/skeleton as it moves into different position or poses. Animators define sequences of frames that show movement of the model over time, resulting in an animation sequence. However, many conventional animation techniques often involve complex and time consuming processes to define and illustrate the wire frame, joints, movements, and the like, over the sequence of frames.

SUMMARY

The following summary describes one or more embodiments of this disclosure. This summary discusses exemplary embodiments and is not intended to limit any aspects of the subject disclosure. This disclosure and embodiments provided herein generally describe techniques for creating a video animation sequence. For example, in one exemplary embodiment, the techniques include a method for creating an animation sequence. The method further describes steps for providing a design template, which includes a skeleton having segments, to illustrate a figure over a sequence of frames. The method also describes steps for identifying a spine segment of the skeleton, and generating a hip segment, a shoulder segment, and a head segment for the skeleton at respective positions relative to the spine segment. The method further includes steps for identifying one or more limb segments associated with at least one of the shoulder segment or the hip segment, identifying a facial feature segment associated with the head segment, and determining respective endpoints (e.g., using a giftwrapping algorithm, etc.) for one or more segments of the skeleton based on pixels associated with each segment. Moreover, the method includes steps for converting the one or more segments into one or more splines bound between the respective endpoints. In addition, in some embodiments, the one or more splines include spine splines, hip splines, shoulder splines, facial feature splines, limb splines, etc. as well as fixed knot counts that define the one or more changes. The method also includes steps for determining one or more changes between frames for at least one spline, where the one or more changes are typically associated at least one of a position, a shape, or a size. The method further animates movement of the figure over the sequence of frames based on the one or more changes for the at least one spline.

In addition, in some embodiments, the steps for determining the one or more changes further includes determining a change for the at least one spline between a first frame and a second frame. In such embodiments, the method also describes steps for generating one or more intermediate frames to illustrate a progression of the change for the at least one spline between the first frame and the second frame. Further, the step for animating the movement of the figures also includes animating the movement of the figure based on the one or more intermediate frames.

In other embodiments, the method also converts the one or more segments into the one or more splines by resampling one or more pixels positioned between the respective endpoints for the one or more segments. Additionally, in some embodiments, the method also includes steps for receiving texture data (e.g., skinning data) for the figure, and provides steps for mapping the texture data to the one or more splines.

In one or more additional embodiments, the head segment is mapped to 2-dimensional (2D) plane that can rotate about an axis to illustrate a head turn, etc. In this fashion, the steps for determining the one or more changes between frames further includes a change in a facial feature spline associated with the head segment based on a rotation of the 3D virtual plane about the axis.

In another exemplary embodiment, a system employs the above-discussed techniques to create an animation sequence. For example, the system includes a network interface to communicate over one or more communication networks, a processor coupled to the network interface, and a memory configured to store instructions executable by the processor. The system (e.g., the processor) executes the instructions, which are operable to provide a design template, which includes a skeleton having segments, to illustrate a figure over a sequence of frames. The instructions are further operable to identify a spine segment of the skeleton, generate a hip segment, a shoulder segment, and a head segment for the skeleton at respective positions relative to the spine segment, and identify one or more limb segments associated with at least one of the shoulder segment or the hip segment. The instructions also identify a facial feature segment associated with the head segment, and determine respective endpoints for one or more segments of the skeleton based on pixels associated with each segment. The instructions further convert the one or more segments into one or more splines bound between the respective endpoints, determine one or more changes between frames for at least one spline (e.g., where the one or more changes are associated at least one of a position, a shape, or a size), and animate movement of the figure over the sequence of frames based on the one or more changes of each spline between the frames.

In yet another embodiment, a tangible, non-transitory, computer-readable media includes software with encoded instructions executable by a processor. The software describes instructions to create an animation sequence and are operable to provide a design template (e.g., which includes a skeleton having segments) to illustrate a figure over a sequence of frames, identify a spine segment of the skeleton, generate a hip segment, a shoulder segment, and a head segment for the skeleton at respective positions relative to the spine segment, identify one or more limb segments associated with at least one of the shoulder segment or the hip segment, identify a facial feature segment associated with the head segment, determine respective endpoints for one or more segments of the skeleton based on pixels associated with each segment, convert the one or more segments into one or more splines bound between the respective endpoints, determine one or more changes between frames for at least one spline (e.g., where the one or more changes are associated at least one of a position, a shape, or a size), and animate movement of the figure over the sequence of frames based on the one or more changes of each spline between the frames.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a block diagram of animation sequences, particularly showing frames with facial features drawn by an artist as well as corresponding facial feature spline-based frames;

DETAILED DESCRIPTION

Figure 1:
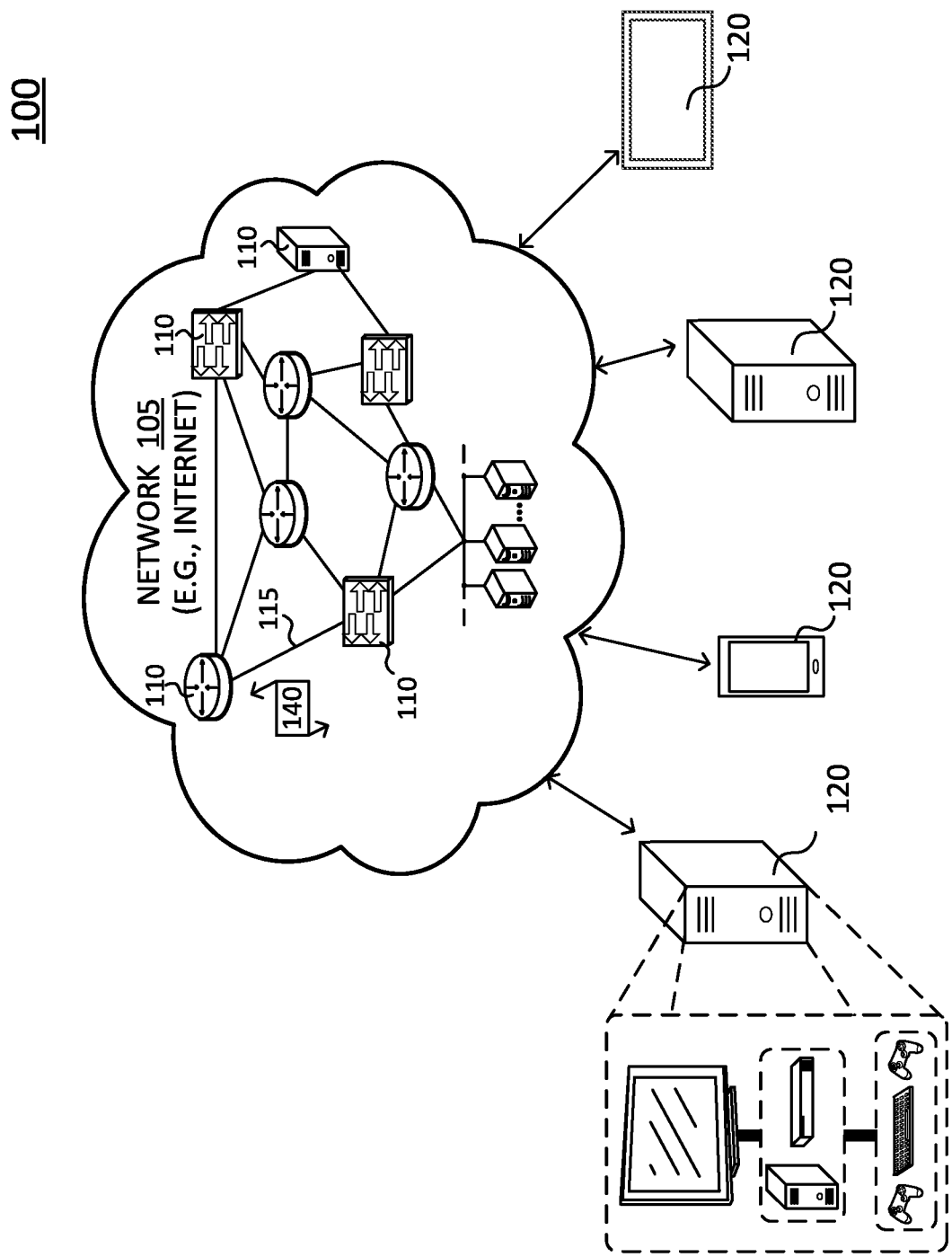
FIG. 1 illustrates a schematic diagram of an example communication network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As discussed in greater detail herein, the subject disclosure relates to computer animation and particularly provides improved techniques that simplify creating an animation sequence—e.g., employing a spline-based animation process. In general, the spline-based animation process identifies segments of a figure or object from a design template and converts such segments into corresponding splines (e.g., Catmull-Rom splines, Hermite splines, B-Splines, Bezier splines, etc.). In turn, these splines are used to further interpolate/extrapolate movement of the figure/object over a sequence of frames (e.g., intermediate frames). Notably, the spline-based animation process may be incorporated into a drawing tool that facilitates animating movement of a figure or object. For example, the spline-based animation process may be programmed to receive certain types of data files (e.g., paint, etc.), extract segments of a figure or object, convert such segments into respective splines, and animate movement of the splines over a sequence of frames based. With respect to the segments, the drawing tool may provide a design template that allows an artist to represent segments with a simple line (e.g., stick figure representations). In this fashion, the techniques and processes described herein provide a simple, but powerful tool for quickly and efficiently creating an animation sequence.

Referring to the figures, FIG. 1 illustrates a schematic diagram 100 of an example communication environment for employing the techniques disclosed herein. Schematic diagram 100 particularly includes a network 105 (e.g., the Internet). Network 105 is shown for purposes of illustration and can represent various types of networks, including local area networks (LANs) as well as wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Network 105 includes a geographically distributed collection of devices or nodes 110, interconnected by communication links 115 and/or network segments for exchanging data such as data packets and for transporting data to end nodes or devices, such as client devices 120. Client devices 120 include, for example, computing devices, game consoles/systems, mobile devices, tablets, or other devices, as is appreciated by those skilled in the art.

Communication links 115 represent wired links or shared media links (e.g., wireless links, PLC links, etc.) where certain devices, such as, e.g., routers, servers, switches, sensors, computers, etc., may be in communication with other nodes, based on distance, signal strength, current operational status, location, etc. Those skilled in the art will understand that any number of nodes, devices, links, etc. may be used in the communication network, and that the view shown herein is for simplicity Data packets 140 such as network traffic/messages are exchanged between devices over and within communication network 105 using predefined network communication protocols such as certain known wired protocols, wireless protocols (e.g., IEEE Std. 802.15.4, WiFi, Bluetooth®, etc.), power line communication (PLC) protocols, or other shared-media protocols where appropriate. In this context, a protocol consists of a set of rules defining how the devices or nodes interact with each other.

As discussed, client devices 120 can represent a game system/console, such as the illustrated includes console housing, peripheral devices, and display hardware/software (e.g., a TV). Operatively, users can play, spectate, interact with, or otherwise access games and/or network games hosted over network 105.

Figure 2:
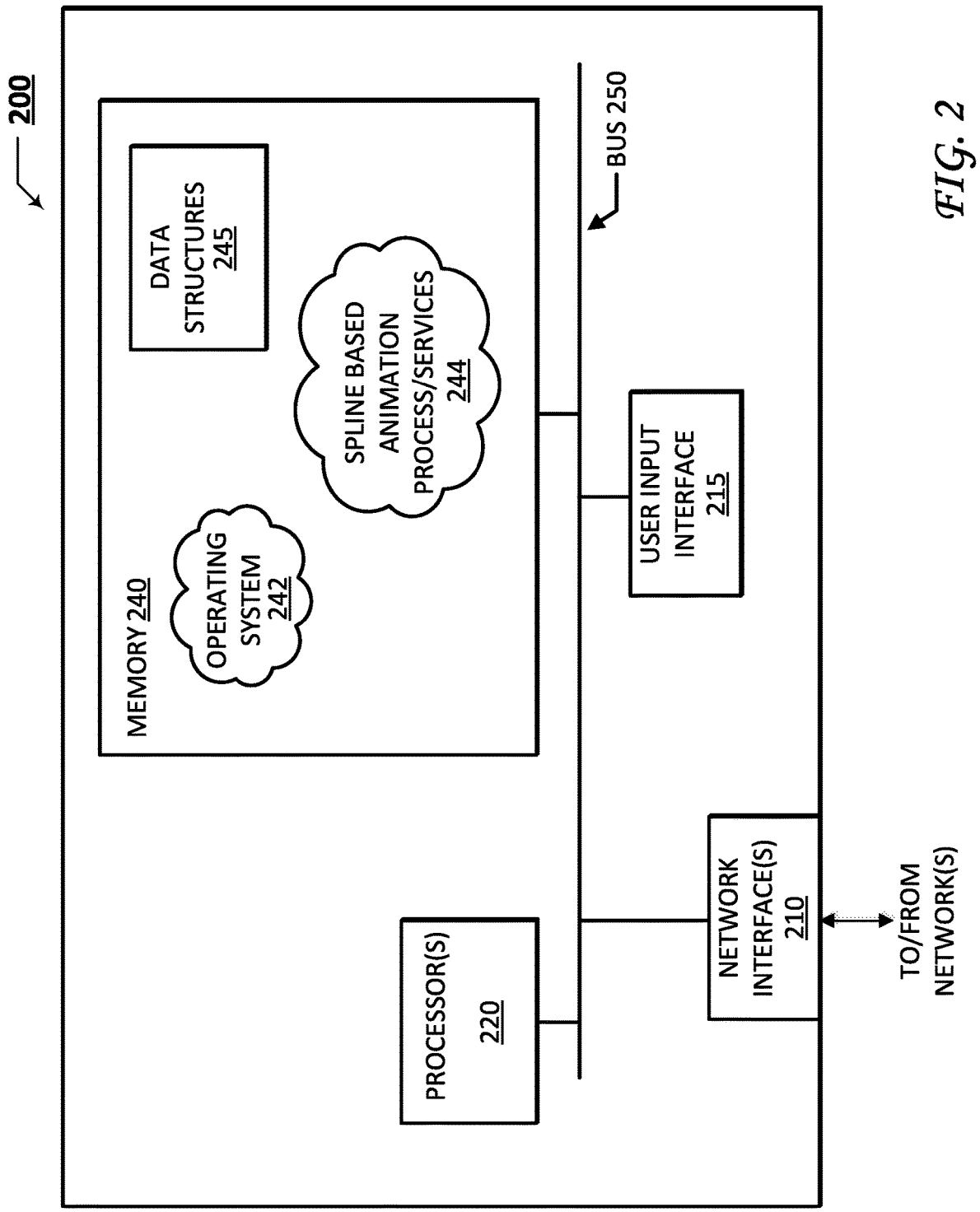
FIG. 2 illustrates a block diagram of an example network device.

FIG. 2 illustrates a block diagram of an example network device/node 200 that represents a system (or portions thereof) for creating an animation sequence according to the techniques disclosed herein. For example, device 200 can represent one of client devices 120 shown in FIG. 1 and/or represent one or more of devices 110 (e.g., in a distributed computing system).

Device 200 particularly includes one or more network interfaces 210, a user input interface 215, at least one processor 220, and a memory 240 interconnected by a system bus 250.

Network interface(s) 210 contain the mechanical, electrical, and signaling circuitry for communicating data over links coupled to one or more of the networks shown in FIG. 1. Network interfaces 210 are configured to transmit and/or receive data using a variety of different communication protocols, as will be understood by those skilled in the art.

User input interface 215 includes graphical user interfaces to solicit and receive user input during game play. For example, user input interface 215 can provide interactive graphical elements that can be manipulated by a user. Such interactive graphical elements can include, for example, objects, figures, selectable elements, and the like.

Memory 240 comprises a plurality of storage locations that are addressable by processor 220 for storing software programs and data structures associated with the embodiments described herein.

Processor 220 may comprise necessary elements or logic adapted to execute the software programs (e.g., instructions) and manipulate data structures 245. An operating system 242, portions of which are typically resident in memory 240 and executed by processor 220, functionally organizes the device by, inter alia, invoking operations in support of software processes and/or services executing on the device. These software processes and/or services may comprise an illustrative "spline-based animation" process/service 244. Note that while processes/services 244 are shown in centralized memory 240, these processes/services may be configured to operate in a distributed communication network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having the spline based animation process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
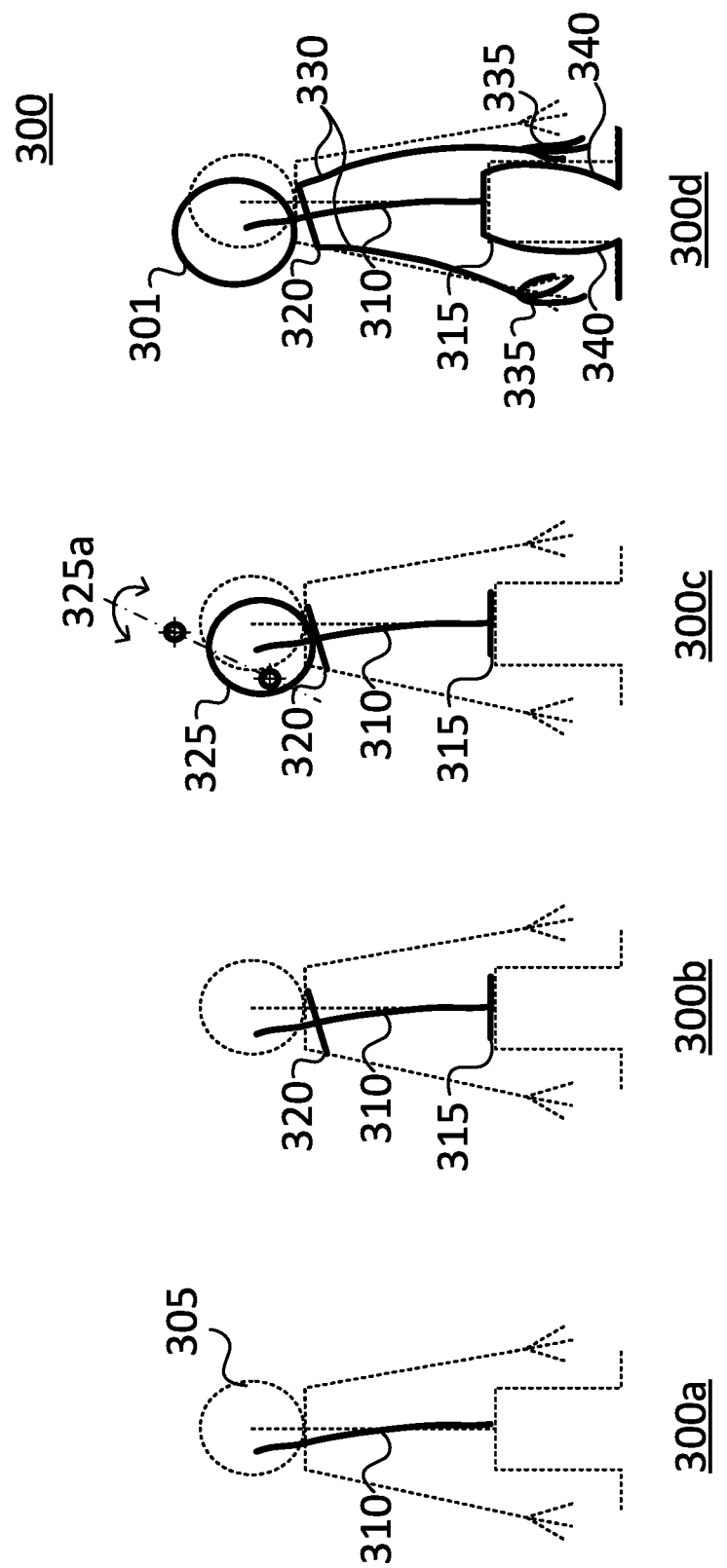
FIG. 3 illustrates a block diagram of a design template for illustrating a figure or object drawn over a progression of frames.

FIG. 3 illustrates a block diagram 300, showing a design template 305 for illustrating a FIG. 301 (or object) drawn over a progression of frames 300a, 300b, 300c, and 300d.

As shown, design template 305 is a skeleton that provides a reference for an artist to draw over. In an operational context, the disclosed spline-based animation process begins with frame 300a, where an artist draws a spine segment 310 over design template 305. Next, in frame 300b, hip segment 315 and shoulder segment 320 are generated at respective positions relative to spine segment 310. In some embodiments, hip segment 315 and shoulder segment 320 are automatically generated by a drawing tool to facilitate spline-based animation process and properly position hip segment 315 and shoulder segment 320 relative to spine segment 310. For example, hip segment 315 and shoulder segment 320 may be automatically calculated based on the position, size, and/or shape of spine segment 310.

Continuing in the progression of frames, a head segment 325 is generated in frame 300c. Similar to hip segment 315 and shoulder segment 320, head segment 325 is generated and positioned relative to spine segment 310 and shoulder segment 320 (e.g., where head segment 325 sits on top of shoulder segment 320). In addition, head segment 325 may be rotated about axis 325a based on selectable/adjustable points of rotation (e.g., here, the points of rotation are illustrated as "bullseye" points). As discussed in greater detail below, these points of rotation allow an artist to change a focus direction (e.g., eye-focus) and/or a head-turn direction for FIG. 301. Moreover, it is also appreciated 3D perspective projection techniques may be employed and compliment rotation of head segment 325 about axis 325a.

The progression of frames ends with frame 300d, where FIG. 301 is fully illustrated. FIG. 301 is a stick figure or a skeleton that includes the above discussed segments as well as additional limb segments drawn by the artist. Here, the additional limb segments include arm segments 330, hand segments 335, and leg segments 340.

Collectively, the progression of frames 300a-300d illustrate one embodiment of the spline-based animation techniques. As discussed, the spline-based animation process generally identifies a spine segment, generates hip, shoulder and head segments at respective positions relative to the spine segment, and identifies additional segments (e.g., limb segments such as arm segments, leg segments, etc.) drawn by the artist. As discussed in greater detail below, these segments are further converted into respective splines (e.g., spine spline, hip spline, shoulder spline, facial feature spline(s), etc.) for subsequent animation.

Figure 4:
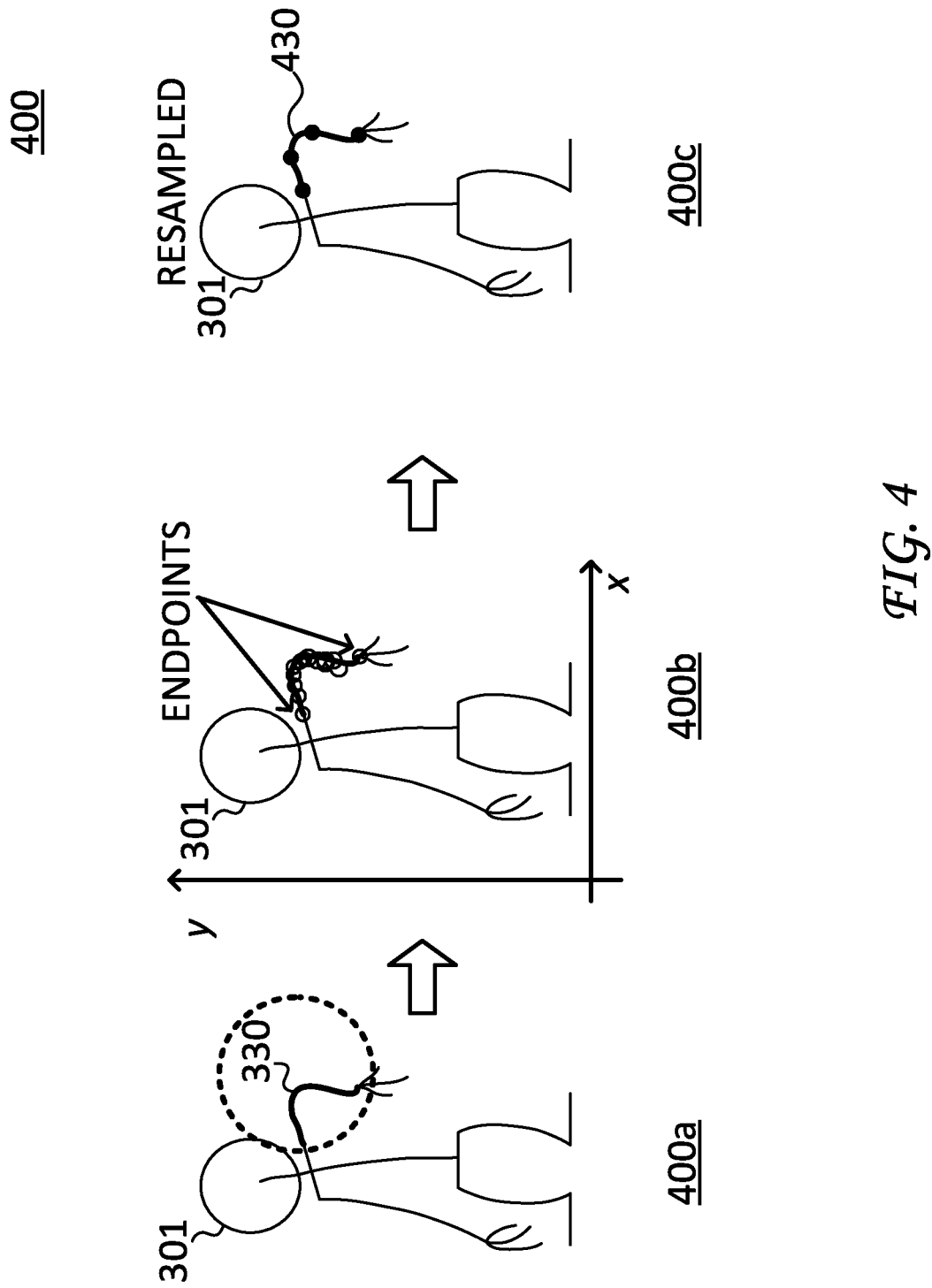
FIG. 4 illustrates a block diagram of a spline-based animation process for converting segment of the figure or object into corresponding splines.

FIG. 4 illustrates a block diagram 400 of a process to convert segments of a figure into corresponding splines (e.g., Catmull-Rom splines, etc.). As shown, one of the limb segments—i.e., arm segment 330—is converted into an arm spline 430. In operation, the spline-based animation process receives a design template that includes an illustrated figure, shown by frame 400a, and maps pixels corresponding to the figure into a coordinate system (e.g., x, y system) shown by frame 400b. The spline-based animation process further determines "endpoints" for each segment—here, arm segment 330, using for example, a giftwrapping algorithm for pixels associated with the segment (e.g., computing a convex hull for a given set of points, etc.). Once the endpoints for the segment are determined, the spline-based animation process further re-samples the pixels associated with the segment and converts the pixels into a spline having a fixed knot count, shown in frame 400c. For example, frame 400c illustrates arm spline 430 having a fixed knot count (knot count=4). However, it is also appreciated a variable number of knots can be used as appropriate. As discussed herein, the spline-based animation process is part of an iterative process that converts segments of an object or figure into corresponding splines and illustrates movement of the splines over a sequence of frames.

Figure 5:
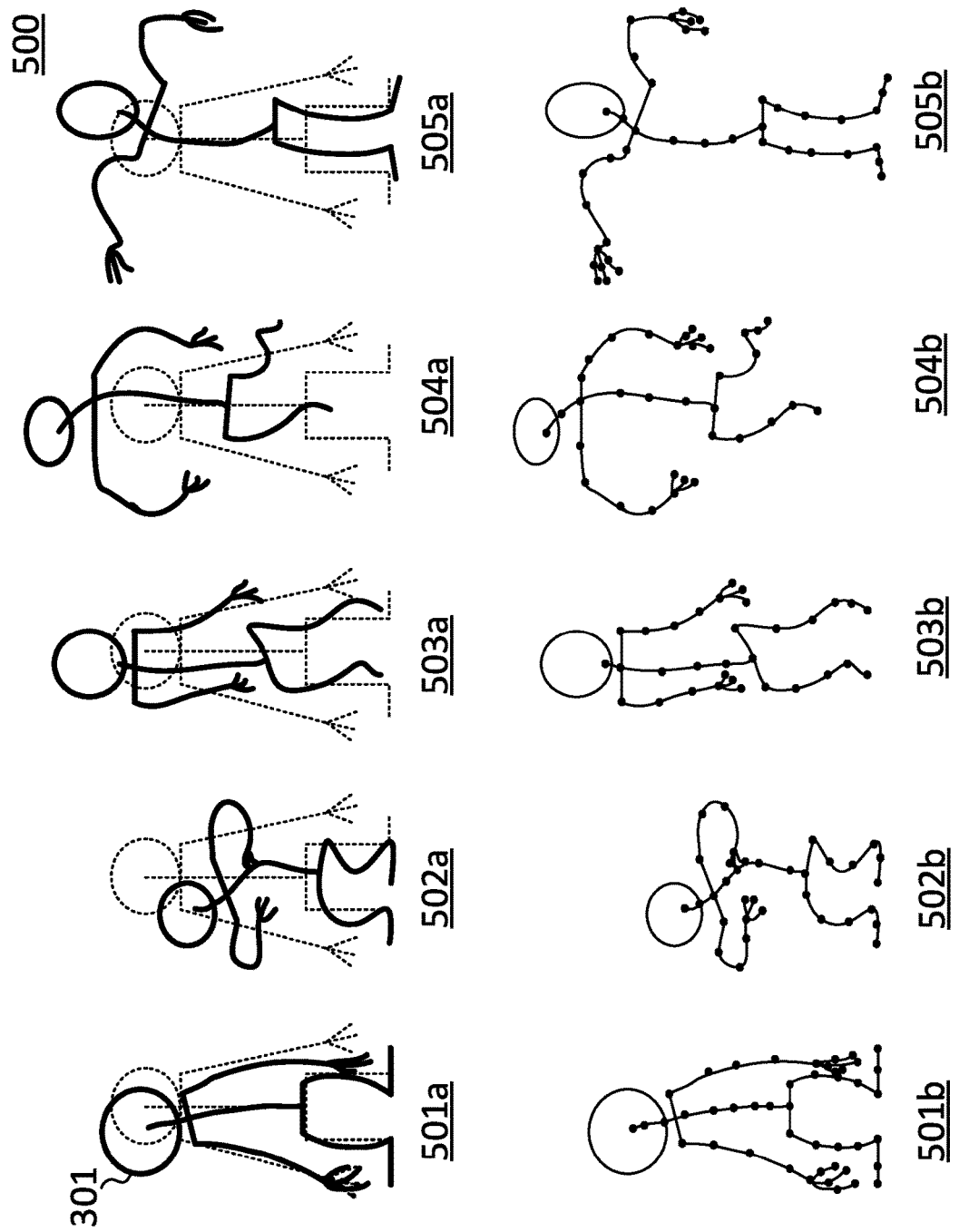
FIG. 5 illustrates a block diagram of animation sequences, particularly showing frames drawn by an artist as well as corresponding spline-based frames.

FIG. 5 illustrates a block diagram 500 of animation sequences for FIG. 301. The animation sequences are shown by two sets of frames—namely, frames 501a-505a, drawn by an artist, and a corresponding spline-based frames 501b-505b. While FIG. 4 illustrates the spline-based animation process for a given frame where a segment of FIG. 301 is converted into a corresponding spline, FIG. 5 illustrates a sequence of frames that use the same conversion process for multiple frames. In particular, the spline-based animation process receives a sequence of frames 501a-505a for FIG. 301 and, for each frame, the spline-based animation process identifies and converts segments of FIG. 301 (e.g., spine segments, limb segments, feet segments, hand segments, head segments, etc.) into corresponding splines, each having a fixed knot count. These corresponding splines are shown by frames 501b-505b. Notably, the spline-based animation process may further interpolate/extrapolate positions of the splines for intermediate frames (e.g., "tweening") to facilitate animating movement, as is appreciated by those skilled in the art. In addition, in some embodiments, the animation techniques may employ a key-frame animation techniques to help create a transition between values of a target property over a number of frames. For example, the animation techniques may employ a constant frame rate of spline keys (12 frames-per-second) when interpolating/extrapolating positions of splines for intermediate frames. Alternatively (or in addition), the animation techniques may calculate differences between keys (e.g., using a spline and timestamp), as is appreciated by those skilled in the art.

Figure 6:
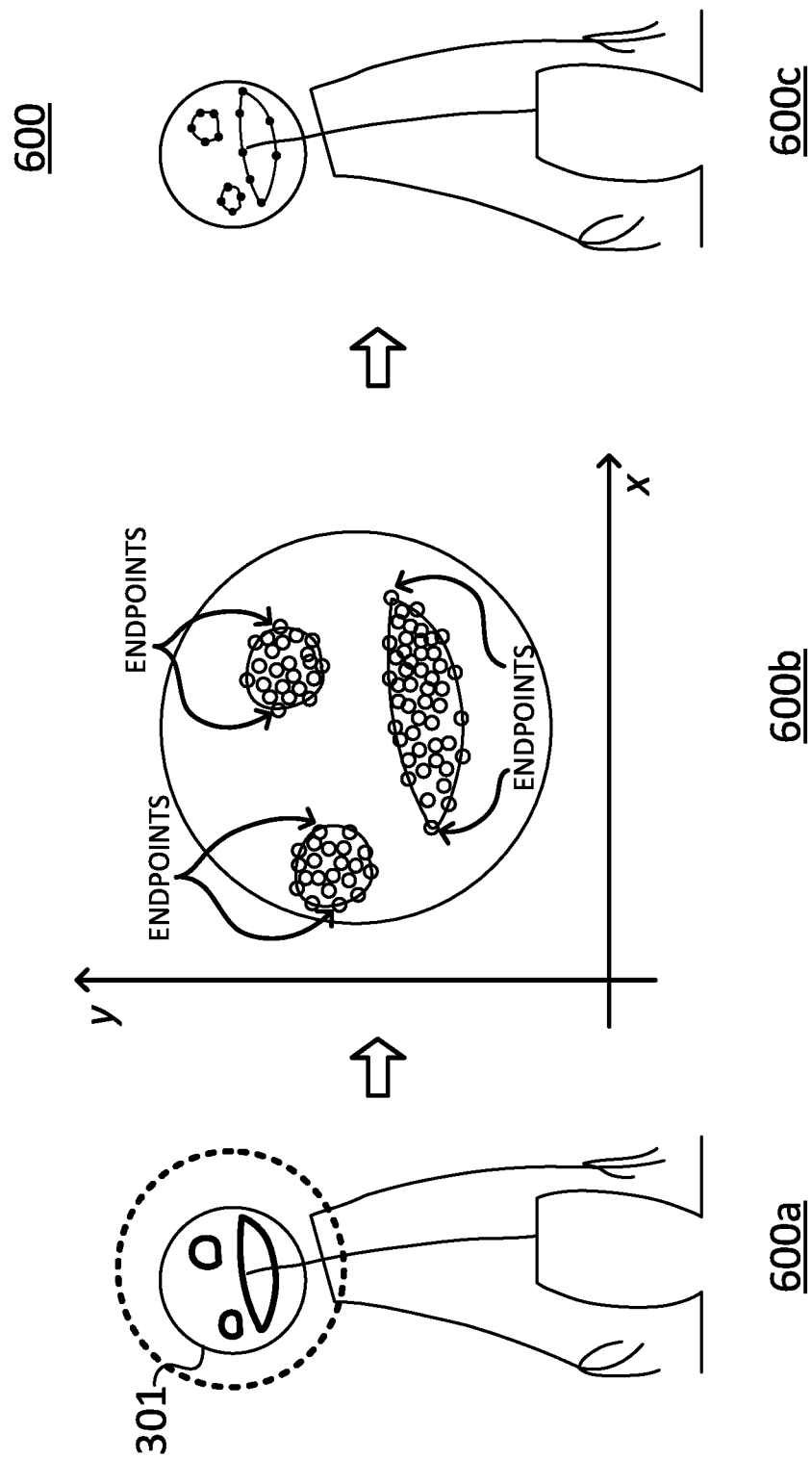
FIG. 6 illustrates a block diagram of a spline-based animation process to convert facial feature segments into corresponding mouth splines and eye-splines.

Collectively, frames 501b-505b illustrate a spline-based animation sequence, showing an illustrated figure jumping in the air and landing back on its feet where movements of FIG. 301 are described by changes to splines (e.g., shape, position, orientation, etc.). Notably, the spline-based animation process FIG. 6 illustrates a block diagram 600 of a process to convert facial feature segments into mouth splines and eye-splines. As shown, a head segment of FIG. 301 includes facial features such as a mouth and eyes. The mouth and eyes are converted into multiple splines, including upper/lower right/left eye splines and upper/lower mouth splines. Converting a single facial feature (e.g., an eye) into multiple splines provides greater flexibility for subsequent movement in an animation sequence (e.g., blinking, winking, wincing, etc.).

In operation, the spline-based animation process receives a design template that includes facial feature segments for FIG. 301, shown by frame 600a. The spline-based animation process further maps pixels corresponding to the facial feature segments into a coordinate system (e.g., x, y system) shown by frame 600b and determines "endpoints" for each segment using for example, a giftwrapping algorithm for pixels associated with the segment (e.g., computing a convex hull for a given set of points, etc.). Once the endpoints for the facial feature segments are determined, the spline-based animation process further re-samples the pixels associated with each segment and converts the pixels into a spline bound by respective endpoints and having a fixed knot count, shown in frame 600c. Notably, a single endpoint may be shared by more than one spline. For example, as discussed, facial feature segments such as eyes, mouth, ears, etc., may be converted into more than one spline (e.g., upper/lower) to provide greater flexibility for subsequent animation. In addition, each of these splines may further include fixed knot counts or variable knot counts, as appropriate. In addition, in some embodiments, the head portion of FIG. 301 may be allocated a larger illustration area relative to an area representing the body.

FIG. 7 illustrates a block diagram 700 of an animation sequences corresponding to facial features of a figure (e.g., FIG. 301). In particular, the animation sequences include frames 705a-720a, drawn by an artist and spline-based frames 705b-720b, generated by the spline-based animation process. The spline-based frames 705b-720b illustrate the above-discussed process to convert facial feature segments into mouth splines and eye-splines over a sequence of frames. Here, the animation sequences show the face moving from an open mouth to a smiling mouth, with corresponding eye movements. For each of the frames drawn by the artist (i.e., frames 705a-720a), the spline-based animation process maps pixels corresponding to facial feature segments into a coordinate system (e.g., x, y system) and determines "endpoints" for each segment. As mentioned above, after determining the endpoints for the facial feature segments, the spline-based animation process further re-samples the pixels associated with each segment and converts the pixels into corresponding splines bound by respective endpoints and having fixed knot counts. In addition, the spline-based animation process can determine relative positions, sizes, and shapes for the splines based on an average of the pixels for the respective spline (e.g., an average number of pixels corresponding to teeth for a mouth spline). That is, referring to spline-based frames 705b-720b, each mouth spline is further shown with a straight line, which represents an average position line for pixels that form the teeth. Collectively, providing upper and lower splines (e.g., upper/lower eye splines, upper/lower mouth splines, etc.) for facial feature segments helps support a variety of movements and/or expressions can (e.g., winking, blinking, surprised, angry, etc.).

Figure 8:
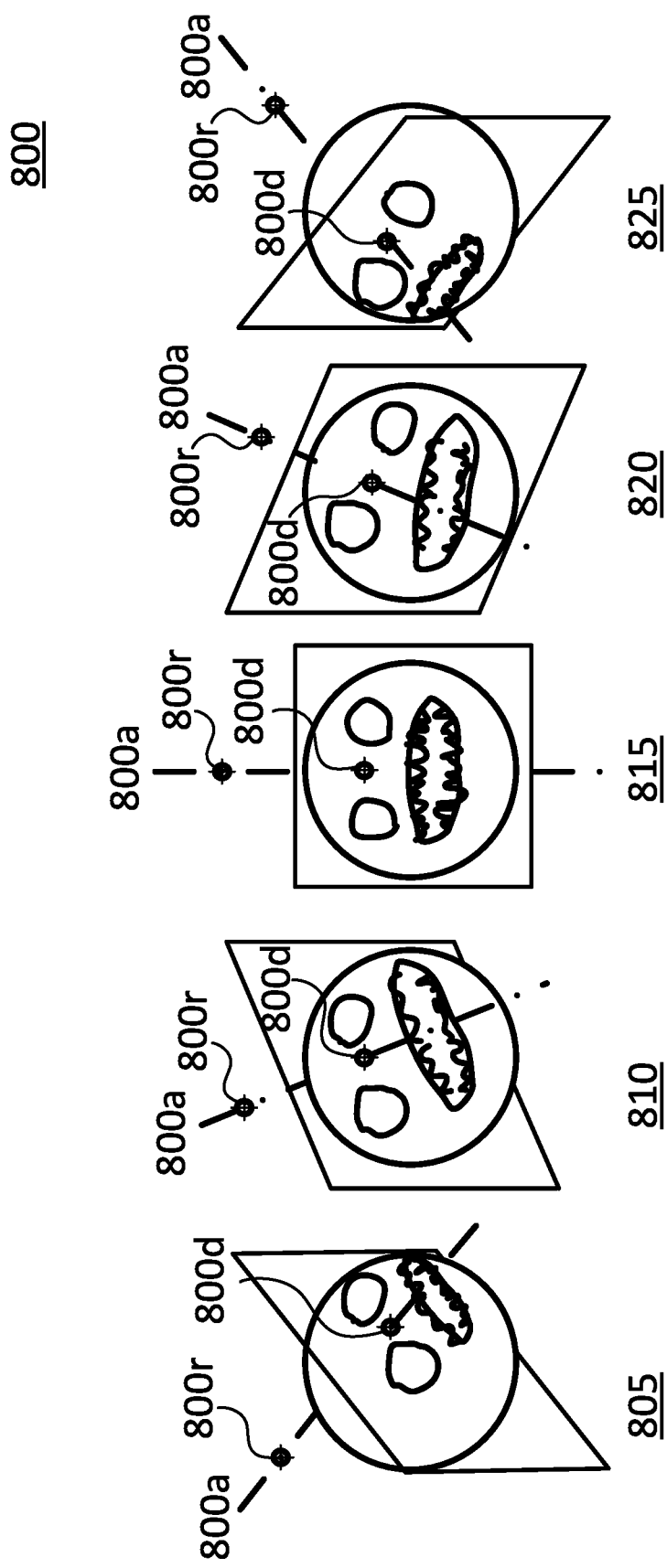
FIG. 8 illustrates a block diagram of a spline-based animation sequence for facial feature splines, particularly showing frames having facial feature splines on a 2-dimensional (2D) plane and rotational movement of the 2D plane about an axis.

FIG. 8 illustrates a block diagram 800 of a spline-based animation sequence for facial feature splines, particularly showing frames 805, 810, 815, 820, and 825, with facial feature splines drawn on a 2-dimensional (2D) plane and rotational movement of the 2D plane about an axis 800a. As discussed above (e.g., ref. FIG. 3, axis 325a), head segments of a figure (or object) may be adjusted or rotated according to selectable points of rotation, illustrated by "bullseyes", which correspond to a rotation point 800r and a direction point 800d. In operation, an artist illustrates facial feature segments (e.g., eye segments, mouth segments, etc.) and specifies a focus direction and/or rotational movement of the head segment for each frame. The focus direction can be modified by changing a position of direction point 800d while the head segment may be rotated about axis 800a by changing the position of rotation point 800r. In addition, as shown, the head segment is mapped to a 2D virtual plane, which intersects a mid-portion of the head segment. Changing the position of rotation point 800r further rotates this 2D virtual plane about axis 800*a*, which, in turn, rotates the head segment (including facial feature segments).

Figure 9:
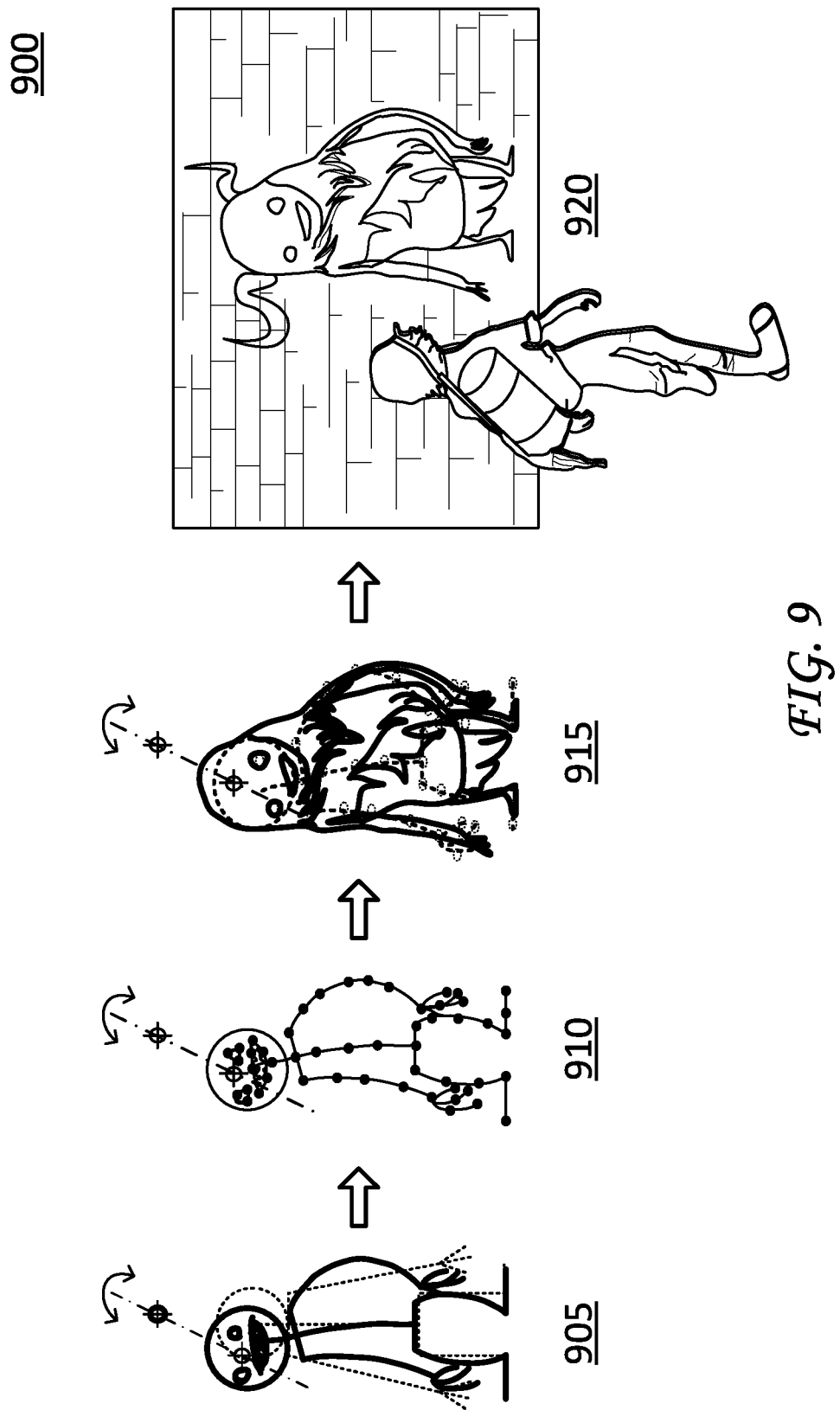
FIG. 9 illustrates a block diagram of a spline-based animation process, showing a progression from a design template, converting segments into corresponding splines, and mapping (e.g., skinning) texture data onto such splines for subsequent display during gameplay.

FIG. 9 illustrates a block diagram 900 of a spline-based animation process. This spline-based animation process collectively incorporates one or more of the above-discussed processes. For example, the spline-based animation process begins with a design template shown in frame 905. The spline-based animation process identifies a spline segment (e.g., drawn by an artist) and generates hip, shoulder, and head segments at respective positions. An artist further illustrates additional limb segments, facial feature segments, and the like, and may also specify a particular direction or rotation of the head segment (including facial feature segments). The spline-based animation process converts each segment into one or more corresponding splines, shown in frame 910. Texture data (e.g., skinning) is further mapped, to the splines shown in frame 915. A resultant animated figure is subsequently displayed during gameplay, shown in frame 920.

Figure 10:
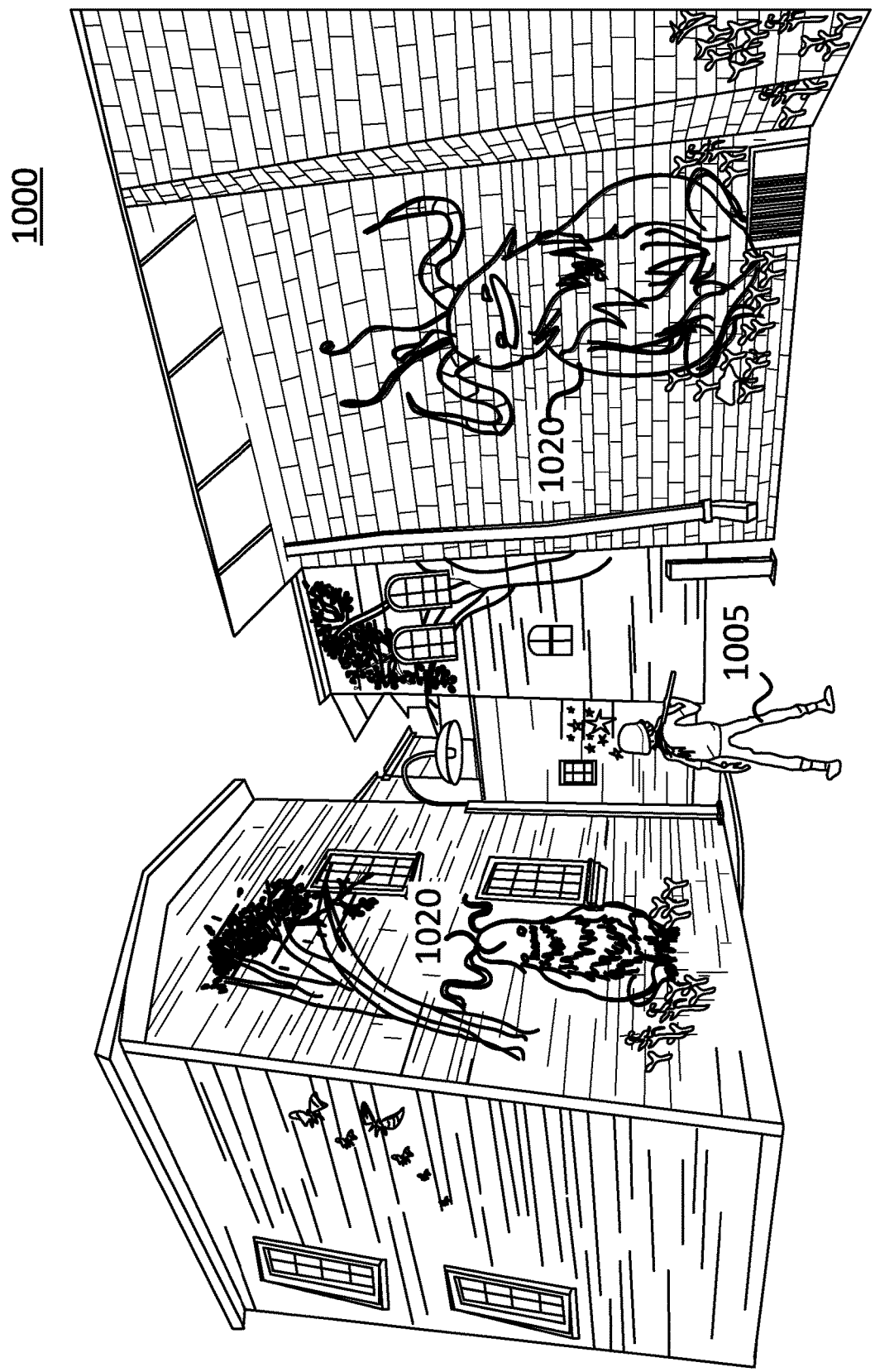
FIG. 10 illustrates a screenshot of gameplay, showing a character drawing 2D objects or figures (e.g., monsters) onto respective surfaces (e.g., walls of a building) for subsequent animation.

FIG. 10 illustrates a screenshot 1000 of gameplay, showing figures (e.g., monsters 1020) as 2D objects drawn onto respective surfaces (e.g., walls of a building). During gameplay, a character 1005 (armed with a paint brush or other drawing tools) illustrates figures or objects such as monsters 1020 on walls or other 2D surfaces. In operation, character 1005 draws simple lines (e.g., stick figure lines) that represent segments of figure. During gameplay, the spline-based animation, process converts such segments into corresponding splines and selects one or more predetermined animation sequences to animate movement of the monsters within the 2D surfaces.

Figure 11:
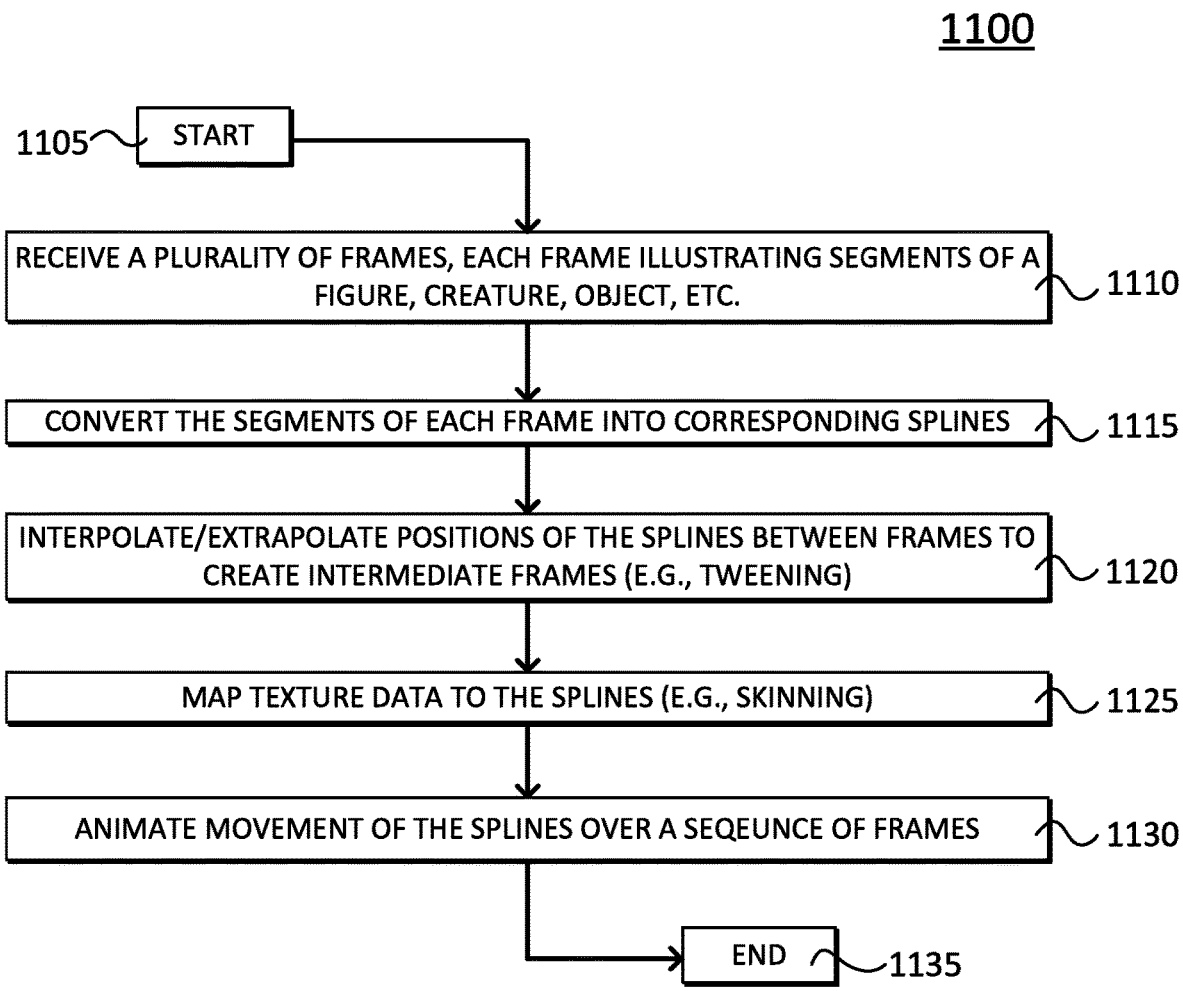
FIG. 11 illustrates an example simplified procedure for creating an animation sequence based on the spline-based techniques described herein.

FIG. 11 illustrates an example simplified procedure 1100 for creating an animation sequence based on the spline-based techniques described herein. Procedure 1100 begins with step 1105 and continues to step 1110 where, as discussed above, a plurality of frames is received, where each frame includes segments of a figure, creature, object, etc. Procedure 1100 continues to step 1115 where the segments are converted into corresponding splines. Next, in step 1120, the positions of the splines between frames are interpolated/extrapolated to create intermediate splines (e.g., using a "tweening" process). In addition, the texture data is mapped (e.g., using a "skinning" process) to corresponding splines in step 1125 and movement of the splines, in step 1130, is animated over a sequence of frames. Notably, movement of the splines also moves corresponding texture data, thus animating movement of the figure, creature, object, etc. over the sequence of frames.

Procedure 1100 subsequently ends at step 1135, but may continue on to step 1110 where a new plurality of frames is received. Collectively, the steps in procedure 1100 describe techniques for a spline-based animation process. It should be noted that certain steps within procedures 1100 may be optional, and further, the steps shown in FIG. 11 are merely examples for illustration. Certain other steps may be included or excluded as desired. Further, while a particular order of the steps is shown and executed from the perspective of a particular device or system, this ordering is merely illustrative, and any suitable arrangement of the steps and/or any number of systems, platforms, or devices may be utilized without departing from the scope of the embodiments herein.

The techniques described herein, therefore, describe improved techniques to simplify creating an animation sequence using spline-based animation techniques. While there have been shown and described illustrative embodiments, it is to be understood that various other adaptations and modifications may be made within the spirit and scope of the embodiments herein. For example, the embodiments have been shown and described herein with relation to certain segments and specific splines. However, the embodiments in their broader sense are not as limited, and may, in fact, map any number of segments of a figure, object, etc. to any number of splines.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for creating an animation sequence during gameplay, the method comprising:

receiving gameplay data that includes a plurality of frames that illustrate a figure within a game environment, the figure based on a design template that includes a skeleton having segments;

identifying a spine segment of the skeleton;

generating a hip segment, a shoulder segment, and a head segment for the skeleton at respective positions relative to the spine segment;

identifying one or more limb segments associated with at least one of the shoulder segment or the hip segment;

identifying a facial feature segment associated with the head segment, the facial feature segment including one or more facial features;
determining respective endpoints for one or more segments of the skeleton based on pixels associated with each segment;
converting the one or more segments into one or more splines having fixed knot counts that define a shape and bound between the respective endpoints;
determining one or more changes between the frames for at least one spline, the one or more changes are associated with at least one position of a direction point and a rotation point for the one or more facial features, the rotation point associated with an axis about which the one or more facial features are rotated;
modifying a focus direction and the axis for the one or more facial features by changing the position of the direction point and the rotation point; and
animating movement of at least the one or more facial features of the figure within the game environment, wherein movement is animated over a sequence of frames based on the one or more changes for the at least one spline in the game environment and the modified focus direction for the one or more facial features during gameplay.

2. The method of claim 1, wherein determining the one or more changes further comprises determining a change for the at least one spline between a first frame and a second frame, the method further comprising:
generating one or more intermediate frames to illustrate a progression of the change for the at least one spline between the first frame and the second frame, and
animating movement of the figure within the game environment, wherein the movement is animated based on the one or more intermediate frames.

3. The method of claim 1, wherein converting the one or more segments into the one or more splines further comprises:
resampling one or more pixels positioned between the respective endpoints for the one or more segments.

4. The method of claim 1, wherein the one or more splines are Catmull-Rom Splines.

5. The method of claim 1, wherein converting the one or more segments into the one or more splines further comprises:
converting the spine segment, the hip segment, the shoulder segment, the one or more limb segments, and the facial feature segment into a spine spline, a hip spline, a shoulder spline, a facial feature spline, and one or more limb splines.

6. The method of claim 1, wherein determining the respective endpoints for the one or more segments further comprises:
determining the respective endpoints based on a gift wrapping algorithm.

7. The method of claim 1, further comprising:
receiving texture data for the figure; and
mapping the texture data to the one or more splines within the game environment.

8. The method of claim 1, wherein the one or more facial features includes at least one eye segment and a mouth segment, wherein converting the one or more segments into the one or more splines further comprises:
converting each eye segment into an upper eye spline and a lower eye spline; and
converting the mouth segment into an upper mouth segment and a lower mouth segment.

9. The method of claim 1, further comprising:
mapping the head segment to a 2-dimensional (2D) plane;
wherein determining the one or more changes between the frames further comprises determining a change in a facial feature spline associated with the head segment based on a rotation of the 2D plane about an axis of rotation.

10. The method of claim 1, wherein animating the movement is further based on a predetermined animation sequence.

11. The method of claim 10, further comprising selecting the predetermined animation sequence based on the converted one or more splines.

12. The method of claim 1, further comprising determining the fixed knot counts based on a feature of the each segment of the figure.

13. The method of claim 1, further comprising determining the fixed knot counts based on a convex hull of the pixels associated with the each segment.

14. The method of claim 1, wherein the segments of the figure are drawn by a user associated with the gameplay in the game environment.

15. The method of claim 14, wherein the segments of the figure are drawn onto a surface of an object within the game environment.

16. The method of claim 14, wherein the segments of the figure are drawn as simple lines.

17. A system for creating an animation sequence during gameplay, the system comprising:
a network interface to communicate in a communication network;
a processor coupled to the network interface; and
a memory configured to store instructions executable by the processor, the instructions, when executed, are operable to:
receive gameplay data that includes a plurality of frames that illustrate a figure within a game environment, the figure based on a design template that includes a skeleton having segments;
identify a spine segment of the skeleton;
generate a hip segment, a shoulder segment, and a head segment for the skeleton at respective positions relative to the spine segment;
identify one or more limb segments associated with at least one of the shoulder segment or the hip segment;
identify a facial feature segment associated with the head segment, the facial feature segment including one or more facial features;
determine respective endpoints for one or more segments of the skeleton based on pixels associated with each segment;
convert the one or more segments into one or more splines having fixed knot counts that define a shape and bound between the respective endpoints;
determine one or more changes between frames for at least one spline, the one or more changes are associated with at least one position of a direction point and a rotation point for the one or more facial features, the rotation point associated with an axis about which the one or more facial features are rotated;
modifying a focus direction and the axis for the one or more facial features by changing the position of the direction point and the rotation point; and
animate movement of at least the one or more facial features of the figure within the game environment, wherein the movement is animated over a sequence of frames based on the one or more changes of the at least one spline in the game environment and the modified focus direction for the one or more facial features during gameplay.

18. The system of claim 17, wherein the instructions to determine the one or more changes are further operable to determine a change for the at least one spline between a first frame and a second frame, wherein the instructions, when executed, are further operable to:
generate one or more intermediate frames to illustrate a progression of the change for the at least one spline between the first frame and the second frame, and
wherein the instructions are further operable to animate movement of the figure within the game environment, wherein the movement is animated based on the one or more intermediate frames.

19. The system of claim 17, wherein the instructions to convert the one or more segments into the one or more splines are further operable to resample one or more pixels positioned between the respective endpoints for the one or more segments.

20. The system of claim 17, wherein the one or more splines are Catmull-Rom Splines.

21. The system of claim 17, wherein the instructions to convert the one or more segments are further operable to convert the spine segment, the hip segment, the shoulder segment, the one or more limb segments, and the facial feature segment into a spine spline, a hip spline, a shoulder spline, a facial feature spline, and one or more limb splines.

22. The system of claim 17, wherein the instructions to determine the respective endpoints for the one or more segments are further operable to determine the respective endpoints based on a gift wrapping algorithm.

23. The system of claim 17, wherein the instructions, when executed, are further operable to:
receive texture data for the figure; and
map the texture data to the one or more splines within the game environment.

24. The system of claim 17, wherein the one or more facial features includes at least one eye segment and a mouth segment, wherein the instructions to convert the one or more segments into the one or more splines are further operable to:
convert each eye segment into an upper eye spline and a lower eye spline; and
convert the mouth segment into an upper mouth segment and a lower mouth segment.

25. A tangible, non-transitory, computer-readable media having instructions encoded thereon, the instructions, when executed by a processor, are operable to:
receive gameplay data that includes a plurality of frames that illustrate a figure within a game environment, the figure based on a design template that includes a skeleton having segments;
identify a spine segment of the skeleton;
generate a hip segment, a shoulder segment, and a head segment for the skeleton at respective positions relative to the spine segment;
identify one or more limb segments associated with at least one of the shoulder segment or the hip segment;
identify a facial feature segment associated with the head segment, the facial feature segment includes one or more facial features;
determine respective endpoints for one or more segments of the skeleton based on pixels associated with each segment;
convert the one or more segments into one or more splines having fixed knot counts that define a shape and bound between the respective endpoints;
determine one or more changes between frames for at least one spline, the one or more changes are associated with at least one position of a direction point and a rotation point for the one or more facial features, the rotation point associated with an axis about which the one or more facial features are rotated;
modifying a focus direction and the axis for the one or more facial features by changing the position of the direction point and the rotation point; and
animate movement of at least the one or more facial features of the figure within the game environment, wherein the movement is animated over a sequence of frames based on the one or more changes of the at least one spline in the game environment and the modified focus direction for the one or more facial features during gameplay.

26. The tangible, non-transitory, computer-readable media of claim 25, wherein the instructions to determine the one or more changes are further operable to determine a change for the at least one spline between a first frame and a second frame, wherein the instructions, when executed, are further operable to:
generate one or more intermediate frames to illustrate a progression of the change for the at least one spline between the first frame and the second frame, and
wherein the instructions are further operable to animate movement of the figure within the game environment, wherein the movement is animated based on the one or more intermediate frames.

27. The tangible, non-transitory, computer-readable media of claim 25, wherein the instructions to convert the one or more segments into the one or more splines are further operable to resample one or more pixels positioned between the respective endpoints for the one or more segments.

* * * * *